US009883127B2

(12) United States Patent
Hoda et al.

(10) Patent No.: US 9,883,127 B2
(45) Date of Patent: Jan. 30, 2018

(54) IMAGE CAPTURING APPARATUS AND CONTROL METHOD THEREFOR

(71) Applicant: CANON KABUSHIKI KAISHA, Tokyo (JP)

(72) Inventors: Saori Hoda, Kawasaki (JP); Hideyuki Rengakuji, Tokyo (JP); Yoshihiro Homma, Asaka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/229,680

(22) Filed: Aug. 5, 2016

(65) Prior Publication Data

US 2016/0344960 A1    Nov. 24, 2016

Related U.S. Application Data

(60) Division of application No. 14/520,922, filed on Oct. 22, 2014, now Pat. No. 9,456,156, which is a continuation of application No. 13/474,288, filed on May 17, 2012, now Pat. No. 8,890,968, which is a continuation of application No. 12/739,234, filed as application No. PCT/JP2008/072719 on Dec. 8, 2008, now Pat. No. 8,441,545.

(30) Foreign Application Priority Data

Dec. 10, 2007 (JP) ................................ 2007-318997

(51) Int. Cl.
*H04N 5/232* (2006.01)
*H04N 5/378* (2011.01)
*H04N 5/367* (2011.01)
*G03B 13/36* (2006.01)
*H04N 5/369* (2011.01)

(52) U.S. Cl.
CPC ............. *H04N 5/367* (2013.01); *G03B 13/36* (2013.01); *H04N 5/23212* (2013.01); *H04N 5/3696* (2013.01); *H04N 5/378* (2013.01)

(58) Field of Classification Search
CPC ...... H04N 5/367; H04N 5/378; H04N 5/3696; H04N 5/23212; G03B 13/36
USPC .. 348/208.12, 222.1, 241, E5.081, 345–346, 348/E5.045
See application file for complete search history.

(56) References Cited

U.S. PATENT DOCUMENTS 6,683,643 B1 *  1/2004  Takayama ............... H04N 5/367
                                                348/247
8,035,702 B2 * 10/2011  Sato ....................... H04N 5/367
                                                348/241

(Continued)

*Primary Examiner* — Hung Lam
(74) *Attorney, Agent, or Firm* — Cowan, Liebowitz & Latman, P.C.

(57) ABSTRACT

An image capturing apparatus includes an image sensor 104 in which at least part of pixels arranged in two dimensions are configured as focus detection pixels with divided-pupil, a memory control circuit 113 configured to read out from a memory position information for the focus detection pixels 401, 402 stored in the memory, and a correction circuit 110 configured to identify positions of the focus detection pixels 401, 402 in the image sensor 104 based on the position information for the focus detection pixels 401, 402 and to correct a defective focus detection pixel signal using defect-free focus detection pixel signals.

7 Claims, 15 Drawing Sheets

(56) References Cited

U.S. PATENT DOCUMENTS

2007/0154200 A1* 7/2007 Utagawa ................ H04N 9/045
                                                          396/111
2007/0165112 A1* 7/2007 Shinmei ................ H04N 5/357
                                                        348/222.1
2007/0206940 A1* 9/2007 Kusaka ................ G03B 13/28
                                                          396/128

* cited by examiner

F I G. 12
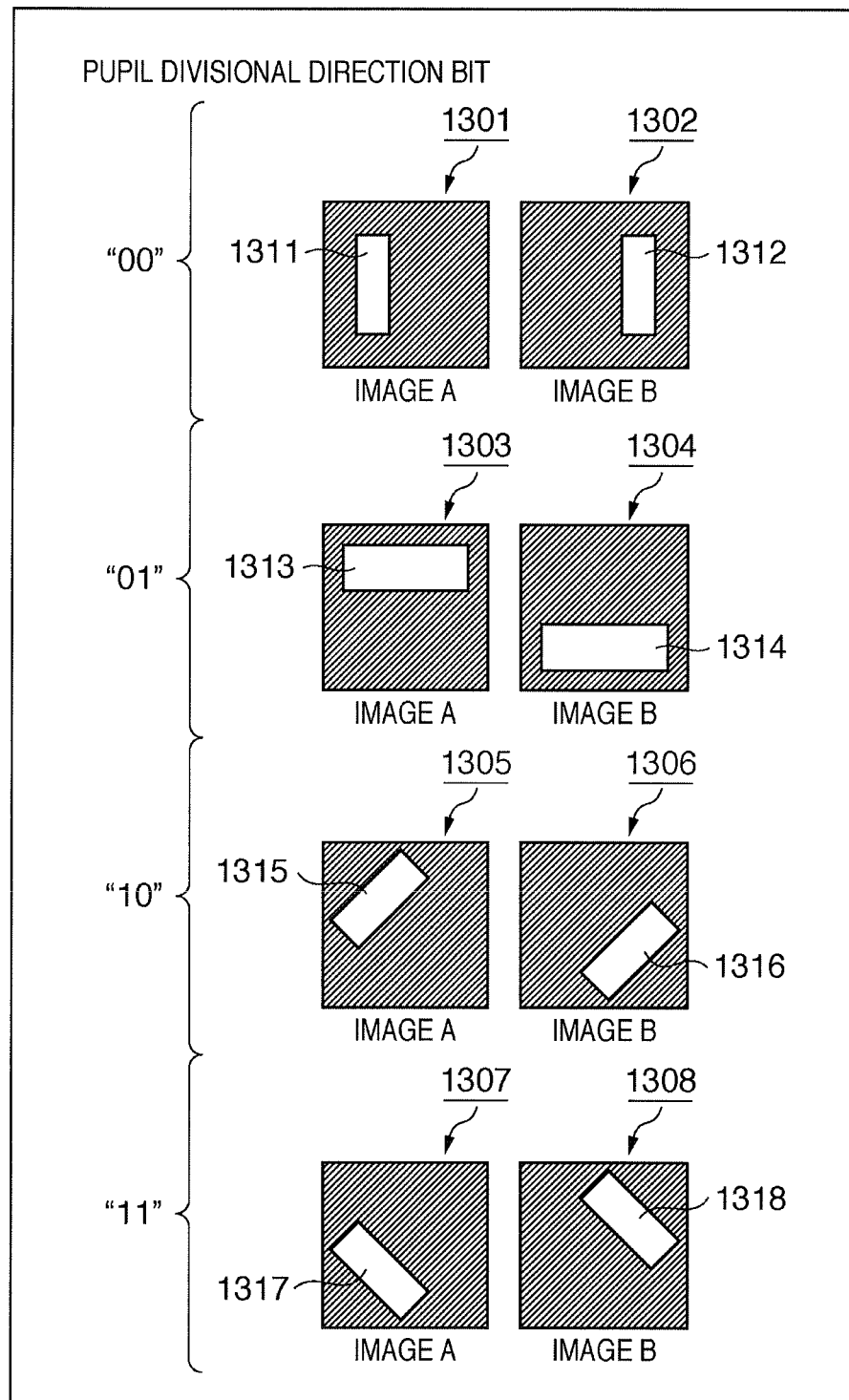

FIG. 14

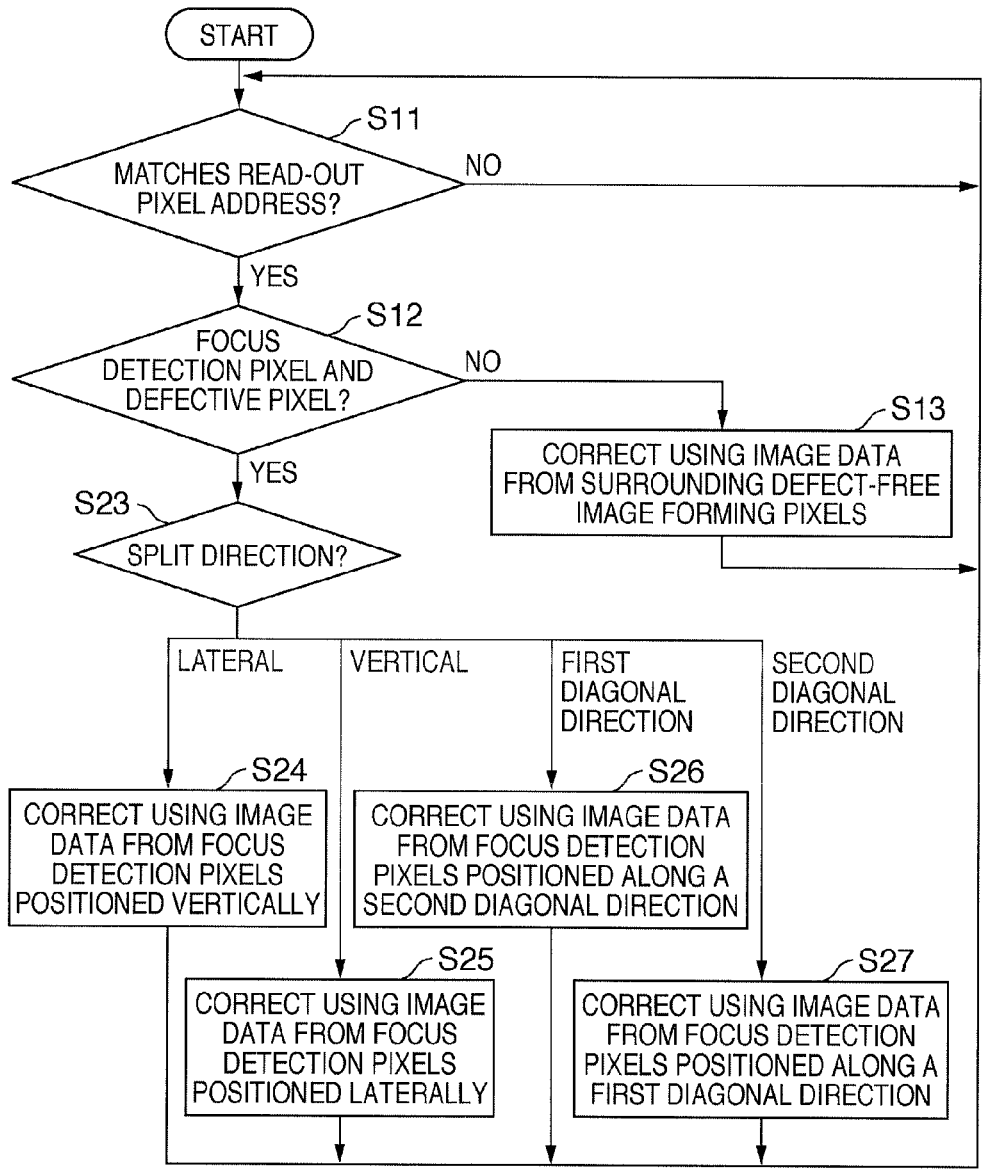

IMAGE CAPTURING APPARATUS AND CONTROL METHOD THEREFOR

CROSS-REFERENCE TO RELATED APPLICATION

This application is a divisional of application Ser. No. 14/520,922, filed Oct. 22, 2014; which is a continuation of application Ser. No. 13/474,288, filed May 17, 2012, now U.S. Pat. No. 8,890,968; which is a continuation of application Ser. No. 12/739,234, filed Apr. 22, 2010, now U.S. Pat. No. 8,441,545; which was the National Stage application under 35 U.S.C. 371 of International Application No. PCT/JP2008/072719, filed Dec. 8, 2008, the entire disclosures of which are hereby incorporated by reference.

TECHNICAL FIELD

The present invention relates to an image capturing apparatus and a control method therefor, and more particularly, to an image capturing apparatus that uses focus evaluation pixels to perform focus detection and a control method for such image capturing apparatus.

BACKGROUND ART

With recent advances in the sophistication of the image sensors with which image capturing apparatuses such as digital still cameras and the like are equipped, performing high-speed, high-accuracy image processing has become more important than ever. At the same time, conventionally, a method of performing autofocus (hereinafter "focus detection") quickly and accurately using a portion of the area of the image sensor for focus adjustment has been proposed.

Japanese Patent Laid-Open No. 2000-156823 discloses an image capturing apparatus in which divided-pupil pixels used for focus detection (hereinafter "focus detection pixels") are positioned at a portion of the G color filters of the R, G, B color filters of the image sensor. Focus detection is performed based on information obtained from these focus detection pixels. Although pixel signals for focus detection are obtained from the focus detection pixels, pixel signals for forming part of an image are not obtained. As a result, it is necessary to compensate signals from the focus detection pixels with neighboring pixel signals of image forming pixels for which pixel signals for forming part of an image are obtained.

By contrast, Japanese Patent Laid-Open No. 2000-305010 discloses a method of interpolating image signals for forming images lost at the positions of the focus detection pixels using image signals obtained from pixels around the focus detection pixels. However, in a case in which defects in the manufacturing process of the image sensor such as white defects and black defects are present in the focus detection pixels, it is difficult to correct the pixel signals for focus detection obtained from the focus detection pixels using the image signals of pixels around the focus detection pixels.

Additionally, Japanese Patent Laid-Open No. 2001-177756 discloses performing focus detection in the same way as a case in which there is no defect in the focus detection pixels by using image forming pixels in the vicinity of the focus detection pixels as focus detection pixels when there is a defect in the focus detection pixels.

However, in Japanese Patent Laid-Open No. 2001-177756 it is assumed that the focus detection pixels are not configured as divided-pupil pixels and are configured the same way as the image forming pixels. As a result, in a case in which the focus detection pixels are configured as divided-pupil pixels, when there is a defect in the focus detection pixels it is difficult to correct the image signals for focus detection using nearby image forming pixels.

DISCLOSURE OF INVENTION

The present invention has been made in consideration of the above situation, and has as its object to perform proper focus detection when there is a defect in focus detection pixels including divided-pupil pixels.

According to the present invention, the foregoing object is obtained by providing an image capturing apparatus comprising:

an image sensor having at least part of pixels arranged in two dimensions are comprised of a plurality of pairs of first detection pixels and second detection pixels, the first detection pixels and the second detection pixels respectively receiving light fluxes that have passed through different pupil regions of a photographing optical system;

a memory control unit configured to read out, from a memory, position information for the detection pixels and pixel information for identifying the first detection pixels and the second detection pixels stored in the memory; and a correction unit configured to identify positions of the detection pixels in the image sensor based on the position information for the detection pixels and to correct, based on the pixel information, a defective first detection pixel signal using defect-free first detection pixel signals and a defective second detection pixel signal using defect-free second detection pixel signals.

According to the present invention, the foregoing object is also obtained by providing a control method of controlling an image capturing apparatus provided with an image sensor in which at least part of pixels arranged in two dimensions are comprised of a plurality of pairs of first detection pixels and second detection pixels, the first detection pixels and the second detection pixels respectively receiving light fluxes that have passed through different pupil regions of a photographing optical system, the control method comprising:

a read-out step of reading out, from a memory, position information for the first and second detection pixels and pixel information for distinguishing between the first detection pixels and the second detection pixels stored in a memory; and a correction step of identifying positions of the detection pixels in the image sensor based on the position information for the detection pixels and correcting, based on the pixel information, a defective first detection pixel signal using defect-free first detection pixel signals and a defective second detection pixel signal using defect-free second detection pixel signals.

Further features and advantages of the present invention will become apparent from the following description of the preferred embodiments (with reference to the attached drawings).

BRIEF DESCRIPTION OF DRAWINGS

FIG. 6 is a diagram showing a correction target pixel and reference pixels in a computation circuit;

FIG. 8 is a diagram showing a correction target pixel and reference pixels in a computation circuit;

FIG. 12 is a diagram illustrating a relation between image A and image B of focus detection pixels and pupil divisional direction bits;

FIG. 14 is a diagram showing a correction target pixel and reference pixels in a computation circuit;

FIG. 16 is a flow chart illustrating steps in a correction process according to the second embodiment of the present invention.

BEST MODE FOR CARRYING OUT THE INVENTION

Preferred embodiments of the present invention will be described in detail in accordance with the accompanying drawings.

First Embodiment

Figure 1:
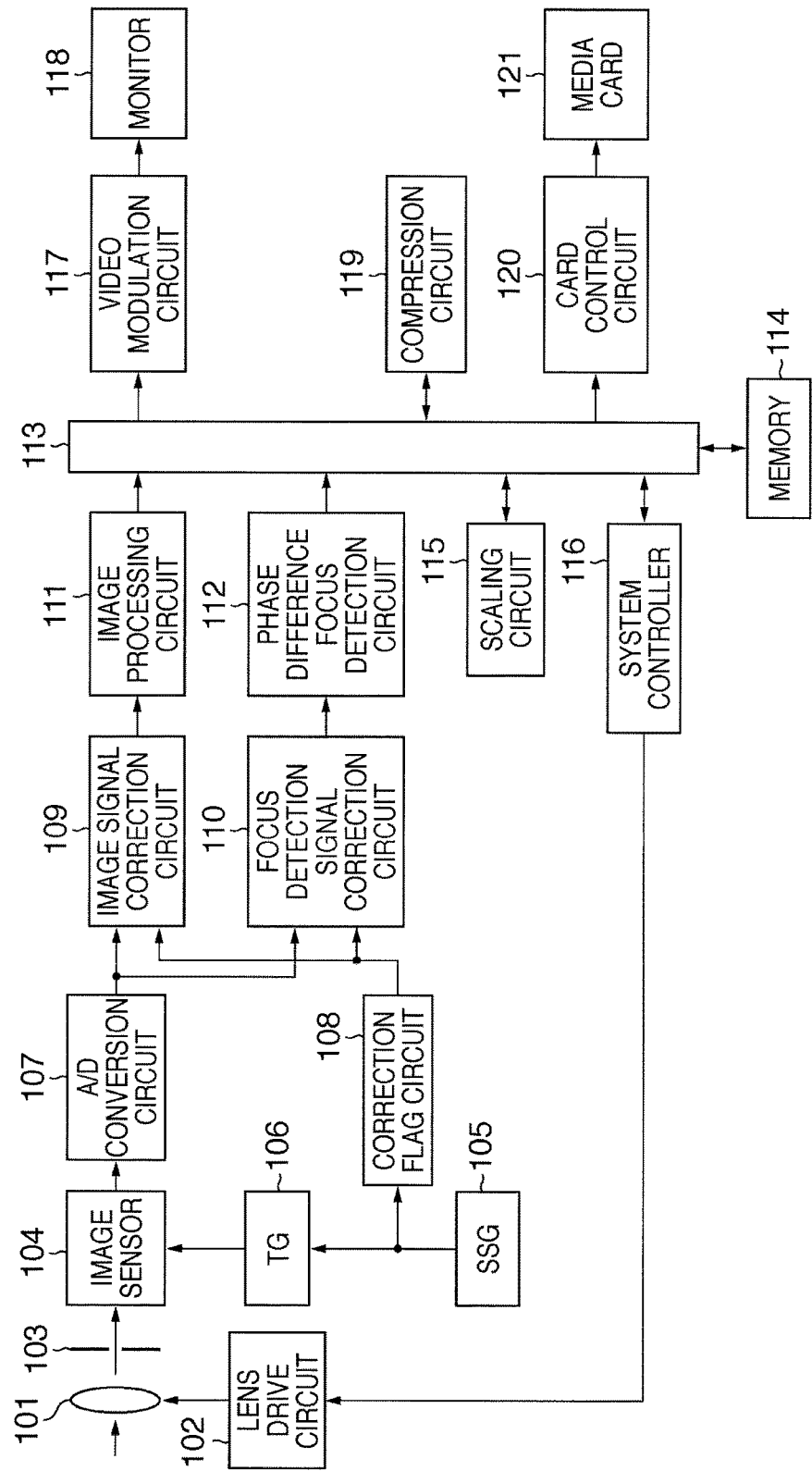
FIG. 1 is a block diagram of an image capturing apparatus according to a preferred first embodiment of the present invention.

FIG. 1 is a block diagram showing the circuit configuration of an image capturing apparatus according to a preferred first embodiment of the present invention. Reference numeral 101 designates a plurality of image sensing lenses, and 102 designates a lens drive circuit for driving the image sensing lenses 101. Reference numeral 103 designates an aperture for adjusting exposure. Reference numeral 104 designates an image sensor, in which pixels comprising photoelectric converter elements that photoelectrically convert incident light are arranged in two dimensions, with at least some of the pixels configured as focus detection pixels for focus detection. Reference numeral 105 designates a synchronization signal generator (hereinafter "SSG") that generates a horizontal synchronization signal HD and a vertical synchronization signal VD of set cycles. Reference numeral 106 designates a timing generator (hereinafter "TG") that generates a control signal that drives the image sensor 104 in synch with the horizontal synchronization signal HD and vertical synchronization signal VD. Reference numeral 107 designates an A/D conversion circuit that converts analog electrical signals into digital signals. Reference numeral 108 designates a correction flag circuit that outputs a flag (position information) that indicates the position of focus detection pixels and defective pixels in the image sensor 104. Reference numeral 109 designates an image signal correction circuit that performs correction processes such as interpolation. The image signal correction circuit 109 identifies the position of focus detection pixels and defective pixels in the image sensor 104 based on flags output from the correction flag circuit 108 indicting spot data and focus detection pixel data included in image data output from the A/D conversion circuit 107. Reference numeral 110 designates a focus detection signal correction circuit that extracts data from focus detection pixel included in the image data output from the A/D conversion circuit 107 and corrects data from defective focus detection pixel. Reference numeral 111 designates an image processing circuit that performs color conversion processing and the like. Reference numeral 112 designates a phase difference focus detection circuit that detects a phase difference from the pixel signals obtained from a plurality of pairs of focus detection pixels and obtains a defocus amount. Reference numeral 114 designates a DRAM or other such memory. Reference numeral 113 designates a memory control circuit that provides an interface to the memory 114. The memory control circuit 113 has the ability to store correction information 301 and 1201 to be described later in the memory 114. Reference numeral 115 designates a scaling circuit that varies the size of the image data. Reference numeral 116 designates a system controller that determines the modes and parameters of each circuit. Reference numeral 118 designates a monitor that displays the image data. Reference numeral 117 designates a video modulation circuit that performs modulation in order to display the image data on the monitor 118. Reference numeral 119 designates a compression circuit for compressing the image data using a compression method such as JPEG compression method or the like. Reference numeral 121 designates a removable media card for recording image data compressed by the compression circuit 119. Reference numeral 120 designates a card control circuit that provides an interface to the media card 121.

Figure 15:
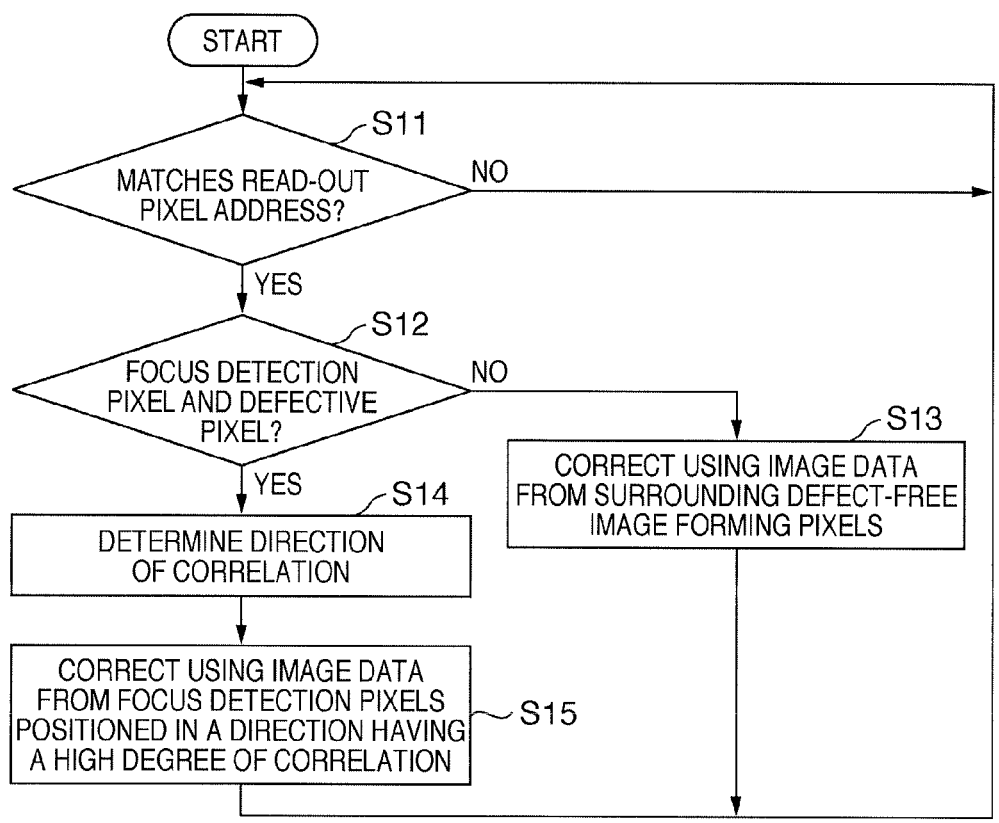
FIG. 15 is a flow chart illustrating steps in a correction process according to the first embodiment of the present invention.

Next, a description is given of an image capture operation of the circuit shown in FIG. 1. The description will proceed while referring to the flow chart of FIG. 15, showing the procedure for a correction process of the first embodiment.

The image sensing lenses 101 are driven to perform focus adjustment by the lens drive circuit 102 controlled by the system controller 116. Light passing through the image sensing lenses 101 is subjected to proper exposure control at the aperture 103 and is photoelectrically converted from light into an electrical signal at the image sensor 104. The TG 106 generates timing signals to make the image sensor operate in synchronization with the horizontal synchronization signals HD and the vertical synchronization signals VD generated at the SSG 105, and controls the image sensor 104. The analog image data output from the image sensor 104 is converted into digital image data at the A/D conversion circuit 107. At the correction flag circuit 108, spot and focus detection pixel flags are operated in accordance with correction information stored in advance in the ROM 201 shown in FIG. 2.

Figure 2:
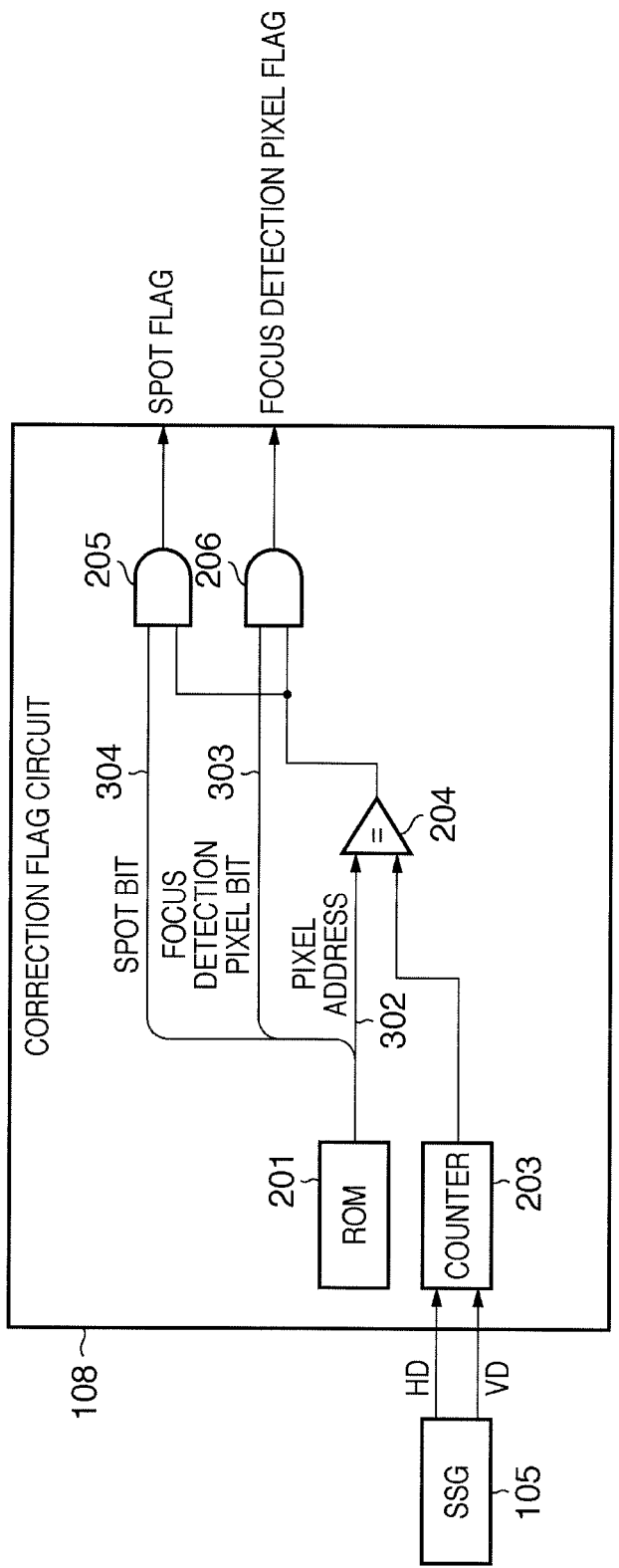
FIG. 2 is a circuit diagram of a correction flag circuit.

Here, a description is given of the operation of the correction flag circuit 108 using FIG. 2.

The ROM 201 stores the correction information 301. A counter 203 is a counter depending on the synchronization signals HD and VD outputted from the SSG 105. A comparator 204 compares the value of a pixel address 302 included in the correction information 301 with a counter value outputted from the counter 203, and if the values are equal, then it outputs a High level signal, and if the values are not equal, then it outputs a Low level signal. An AND circuit 205 outputs a spot bit 304 included in the correction information 301 in a case where High level signal is outputted by the comparator 204, and outputs a Low level signal whenever the Low level signal is output from the comparator 204. An AND circuit 206 outputs a focus detection pixel bit 303 included in the correction information 301 when the High level signal is output from the comparator 204, while outputs a Low level signal whenever the Low level signal is outputted from the comparator 204.

Figure 3:
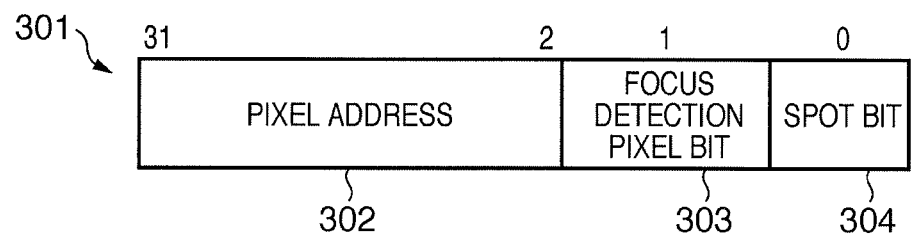
FIG. 3 is a diagram showing a structure of correction information stored in a ROM.

The counter 203 counts the number of pixels in accordance with a horizontal synchronization signal HD and a vertical synchronization signal VD output from the SSG 105. In the ROM 201, the correction information 301 as shown in FIG. 3 is recorded. It is to be noted that each correction information 301 holds one pixel of information. Here, although an example is given of a case in which 32 bits of correction information 301 are recorded, the present invention is not limited thereto. In the correction information 301 are included a pixel address 302, which is information indicating the position of the pixel to be corrected, the focus detection pixel bit 303, and the spot bit 304. Here, the pixel address 302 is 30 bits, the focus detection pixel bit 303 is 1 bit, and the spot bit 304 is 1 bit. However, the present invention is not limited thereto.

The spot bit 304 indicates that there is no spot on the pixel when it is "0" and indicates that there is a spot on the pixel when it is "1". The focus detection pixel bit 303 indicates an image forming pixel when it is "0" and a focus detection pixel when it is "1".

Figure 4A:
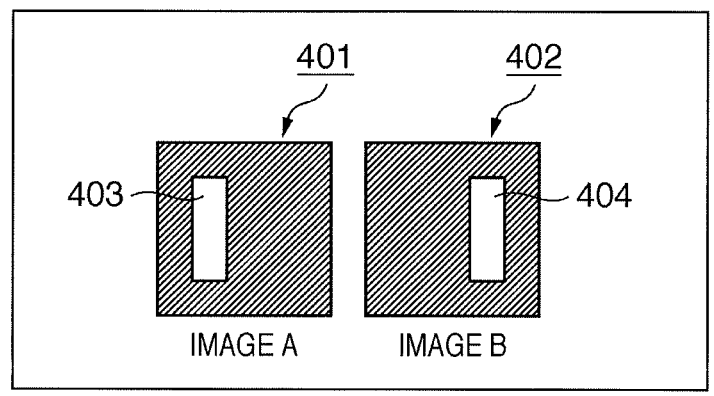
FIGS. 4A and 4B are diagrams showing image A and image B of focus detection pixels.
Figure 4B:
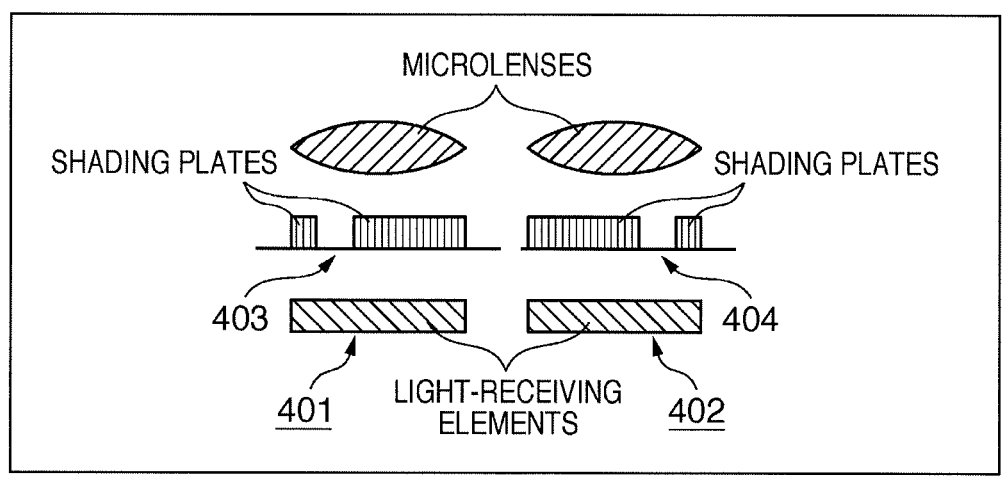

Here, a description is given of the configuration of the focus detection pixels with reference to FIG. 4A and FIG. 4B. FIG. 4A is a plan view of focus detection pixels and FIG. 4B is a cross-sectional view of focus detection pixels. As shown in FIG. 4A and FIG. 4B, regions 403 and 404 are light-receiving portions, with the pupil divided laterally symmetrically between a first focus detection pixel 401 for an image A and a second focus detection pixel 402 for an image B.

When a value on the counter 203 matches the pixel address 302 read out from the ROM 201 (step S11), a spot flag (defect information) and a focus detection pixel flag (focus detection pixel position information), respectively, are output in accordance with the spot bit 304 and the focus detection pixel bit 303 information.

In FIG. 1, the image data output from the A/D conversion circuit 107 as well as the spot flag and the focus detection pixel flag output from the correction flag circuit 108 are input to the image signal correction circuit 109 and the focus detection signal correction circuit 110.

Figure 8:
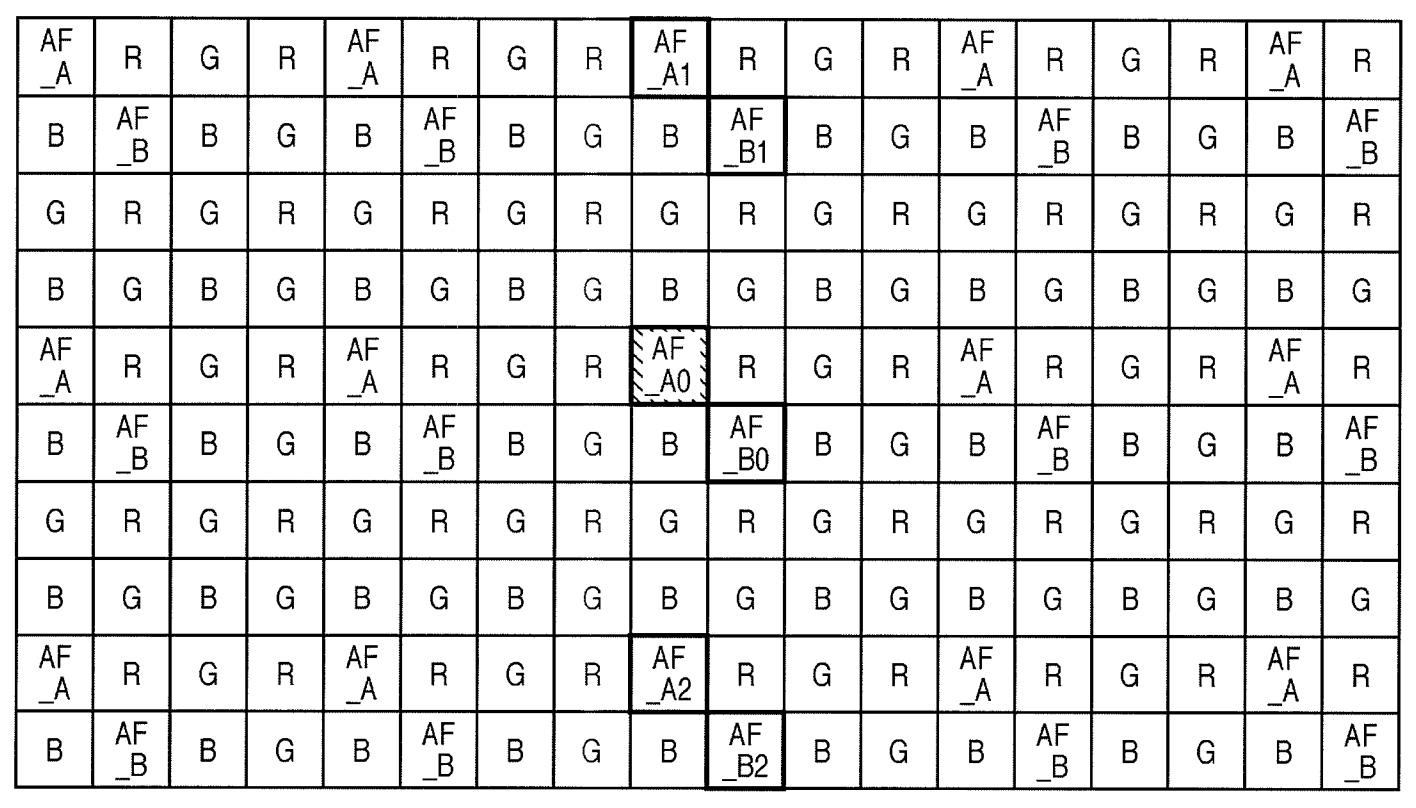

Conditions of pixels for which it is necessary to store correction information 301 in the ROM 201 are cases in which there is a defect on the image forming pixel, cases in which the pixel is a focus detection pixel, and cases in which there is a defect on the focus detection pixel. The focus detection pixels may be arranged, for example, as shown in FIG. 8. To the lower right of focus detection pixels image A AF_A0-AF_A2 are provided focus detection pixels image B AF_B0-AF_B2 to form pairs therewith. For example, if there is a defect on focus detection pixel image A AF_A0, even if there is no spot on the focus detection pixel image B AF_B0 with which it is paired it is still corrected the same as if it did have a defect. Therefore, in a case in which one of a pair of focus detection pixels has a defect, the spot bit for the other focus detection pixel of that pair is also set to "1" and stored in the ROM 201. It is also possible to correct just the focus detection pixel having the defect without correcting the other one without the defect, and use them as is as data for focus detection. In addition, in the event that there is a defect on the focus detection pixel, it is also possible to use neither of them. It is to be noted that pixels which form a pair are not limited to pixels that are the closest to each other, and can be changed depending on the state of focus.

Figure 5:
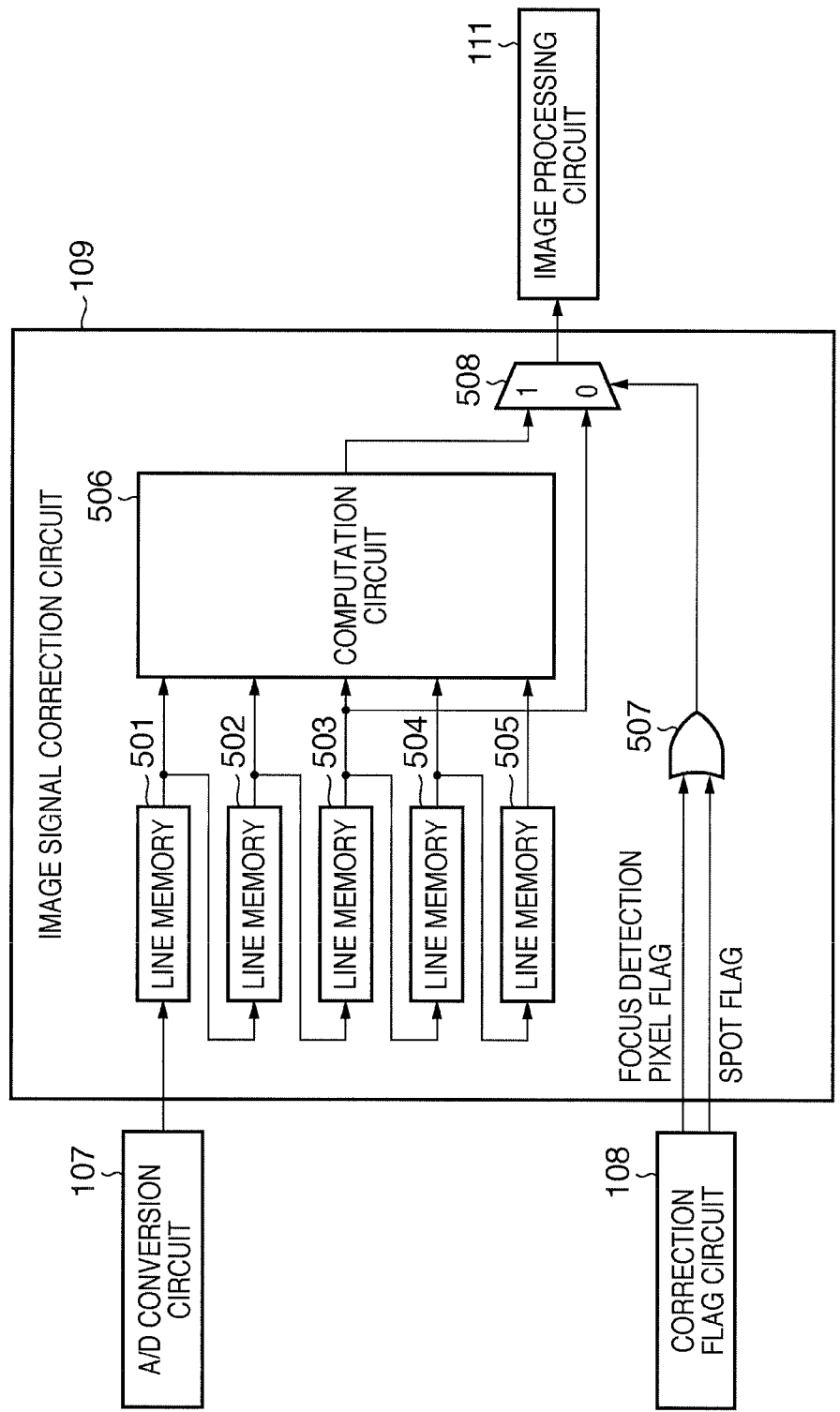
FIG. 5 is a circuit diagram of an image signal correction circuit.

Next, using FIG. 5, a description is given of the operation of the image signal correction circuit 109. In a case in which the spot flag or the focus detection pixel flag has been output (NO at step S12), the image signal correction circuit 109 executes correction processing of the relevant pixels.

The image data output from the A/D conversion circuit 107 is sequentially stored in line memories 501-505. The pixels that have outputted the image data that is to be the target of correction (hereinafter called correction target pixels) are pixels whose image data have come to a center position of the line memories 501-505, in other words image data positioned at the center of the line memory 503. The spot flag and the focus detection pixel flag are each delayed so as to show the correction target pixel information. At a computation circuit 506, the correction target pixel image data is corrected using image data output from image forming pixels around the correction target pixel (step S13).

What is rewritten with pixel data corrected using image forming pixel image data is image data of focus detection pixels or of defective image forming pixels. Therefore, at a selector 508, pixel data corrected at the computation circuit 506 is output for pixels for which a spot flag or a focus detection pixel flag output from the correction flag circuit 108 has been raised. For pixels for which neither the spot flag or the focus detection pixel flag has been raised, the image data of the correction target pixel located at the center of the line memory 503 is output as is, without computation. The output of the selector 508 is input to the image processing circuit 111.

Here, a description is given of the computation method of the computation circuit 506.

Figure 6:
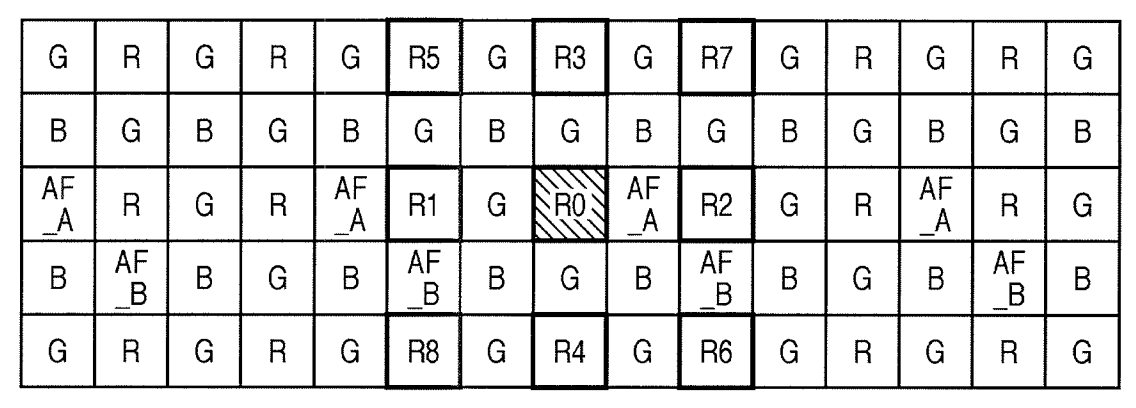

FIG. 6 is a diagram illustrating correction of an image forming pixel R0 that has a defect and for which image data output from the A/D conversion circuit 107 is stored in the line memories 501-505. It is to be noted that, in FIG. 6, R, G, B respectively indicate red, green, and blue filters provided on the pixels.

Consider a case in which there are no defects on image forming pixels R1-R8 in the vicinity of image forming pixel R0, and there are no focus detection pixels. In such a case, correction is performed from the 2 pixels having the highest degree of image correlation from among directions R1-R2, R3-R4, R5-R6, and R7-R8. For example, if the direction R1-R2 has the highest correlation, then R0=(R1+R2)/2.

At the image processing circuit 111, signal processing such as color conversion processing, Gamma processing, and white balance processing is performed on the corrected image data output from the image signal correction circuit 109, and written into the memory 114 by the memory control circuit 113.

Figure 7:
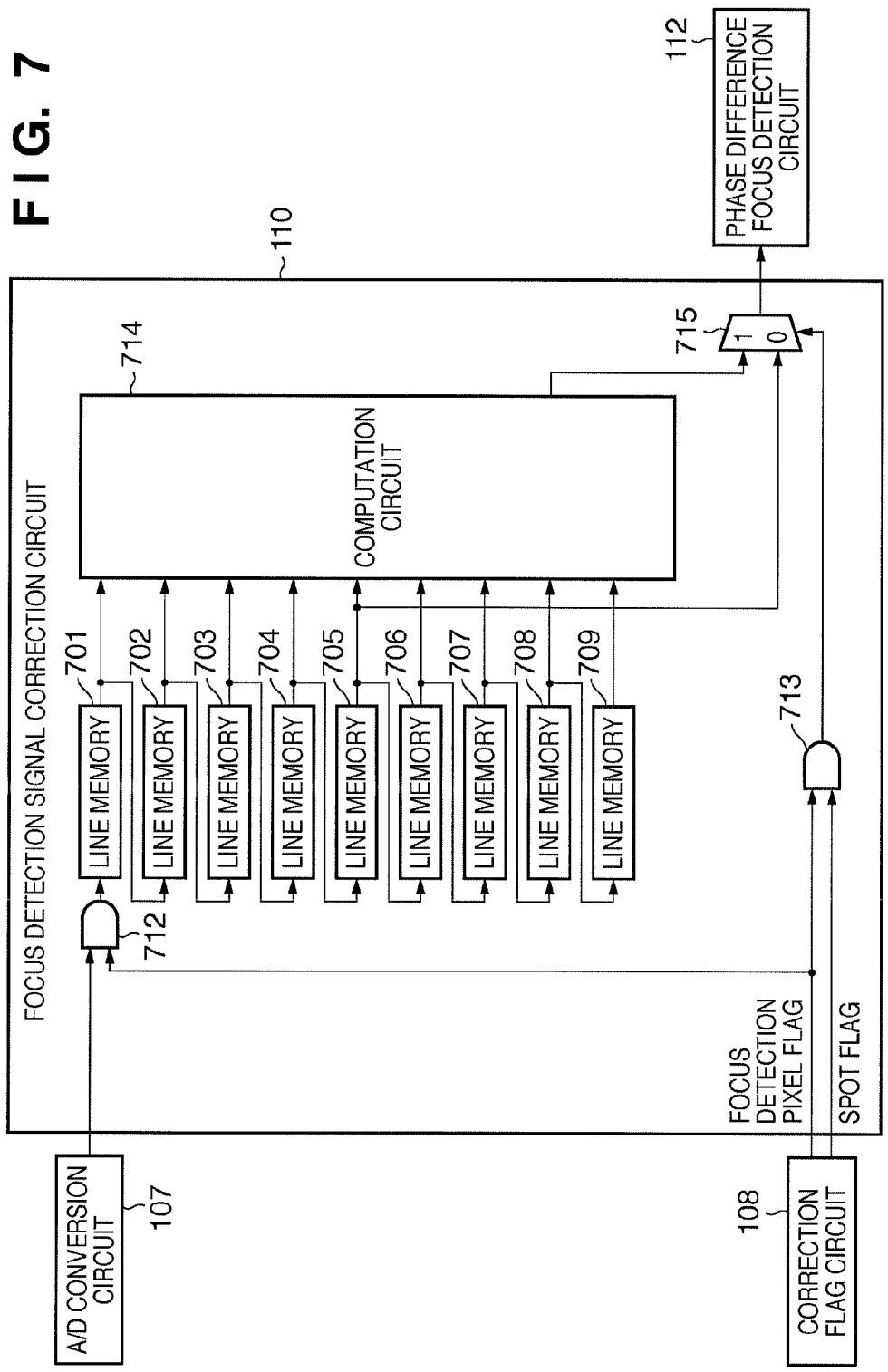
FIG. 7 is a circuit diagram of a focus detection signal correction circuit.

Next, a description of the operation of the focus detection signal correction circuit 110 in FIG. 1 is given using FIG. 7. In a case in which both the spot flag and the focus detection pixel flag are output (YES at step S12), the focus detection signal correction circuit 110 executes correction processing on the relevant pixels.

The image data output from the A/D conversion circuit 107 is input to an AND circuit 712, as is pixel data for which the focus detection pixel flag is "1", such that the image data is then sequentially stored in line memories 701-709. Correction target pixels are pixels whose data have come to a center position in the line memory 701-709, that is, data positioned at the center of line memory 705. The spot flag and the focus detection pixel flag are each delayed so as to show the correction target pixel information. At the computation circuit 714 the correction target pixel image data is corrected using image data output from focus detection pixels around the correction target pixel.

At a selector 715, when both the spot flag and the focus detection pixel flag output from the correction flag circuit 108 are raised, that is, for a focus detection pixel that has a defect, the focus detection signal correction circuit 110 operates as follows: The focus detection signal correction circuit 110 outputs the pixel data corrected at the computation circuit 714 to the selector 715, and for focus detection pixels with no defects outputs to the selector 715 image data of correction target pixels positioned at the center of the line memory 705 as is, without computation. The output of the selector 715 is input to the phase difference focus detection circuit 112.

Here, a description is given of the computation method in the computation circuit 714.

FIG. 8 is a diagram illustrating correction of the image data of a focus detection pixel AF_A0 that has a defect among focus detection pixel data stored in the line memories 701 to 709.

The pupil of the focus detection pixel is symmetrically divided as shown in FIG. 4A and FIG. 4B. With such a configuration it is easy to detect vertical stripes, and thus vertical pixels have a high degree of correlation. Therefore, the computation circuit 714 determines the degree of correlation of the correction target pixel (step S14), and based on the results of that determination, in this case, the image data of the focus detection pixels AF_A0 is corrected from the image data of the focus detection pixels above and below the focus detection pixels AF_A0 (step S15).

Consider a case in which there is no defects on focus detection pixels AF_A1 and AF_A2 that are nearby and above and below focus detection pixel AF_A0. The correction computation for the image data of the focus detection pixel AF_A0 is AF_A0=(AF_A1+AF_A2)/2. In addition, since the spot flag is also set at "1" for the spot-less focus detection pixel AF_B0 that is paired with focus detection pixel AF_A0, correction computation AF_B0=(AF_B1+AF_B2)/2 is also performed therefor.

In the phase difference focus detection circuit 112, focus detection is performed on the spot-corrected focus detection pixel data output from the focus detection signal correction circuit 110, and that phase difference information is sent to the system controller 116. Based on the sent phase difference information, the system controller 116 controls the lens drive circuit 102 and adjusts the image sensing lenses 101.

At the image processing circuit 111, signal processing is performed and the image data stored in the memory 114 is read out to the scaling circuit 115 by the memory control circuit 113.

At the scaling circuit 115 the image data size is scaled to a size suitable for display on the monitor 118 or to a size suitable for recording on the media card 121.

The scaled image data is written to the memory 114 by the memory control circuit 113. In addition, the scaled image data can be read out from the memory 114 by the video modulation circuit 117, modulated by NTSC or PAL, and displayed on the monitor 118. In addition, the scaled image data can be read out from the memory 114 by the compression circuit 119, compressed according to the JPEG or other compression method, and written to the memory 114. Moreover, the scaled image data can be read out from the memory 114 by the card control circuit 120 and written to the media card 121.

Thus, as described above, because a distinction is made between image forming pixels and focus detection pixels, image signals of defective image forming pixels can be corrected by image signals of image forming pixels and image signals of defective focus detection pixels can be corrected by image signals of focus detection pixels. As a result, image signals of image forming pixels and focus detection pixels can be corrected in parallel. In addition, by performing correction on the image signals output from both pixels even when only one of a pair of focus detection pixels is defective, information for focus detection can be prevented from becoming unbalanced.

It is to be noted that, in a defocus state, in some cases there is not much difference between when image signals of defective focus detection pixels are corrected using image signals of focus detection pixels and when corrected using image signals of image forming pixels. In such cases, depending on the state of focus of the image capturing apparatus, matters may be configured so that defective focus detection pixel signals are corrected based on pixel signals of image forming pixels other than focus detection pixels.

Second Embodiment

Figure 9:
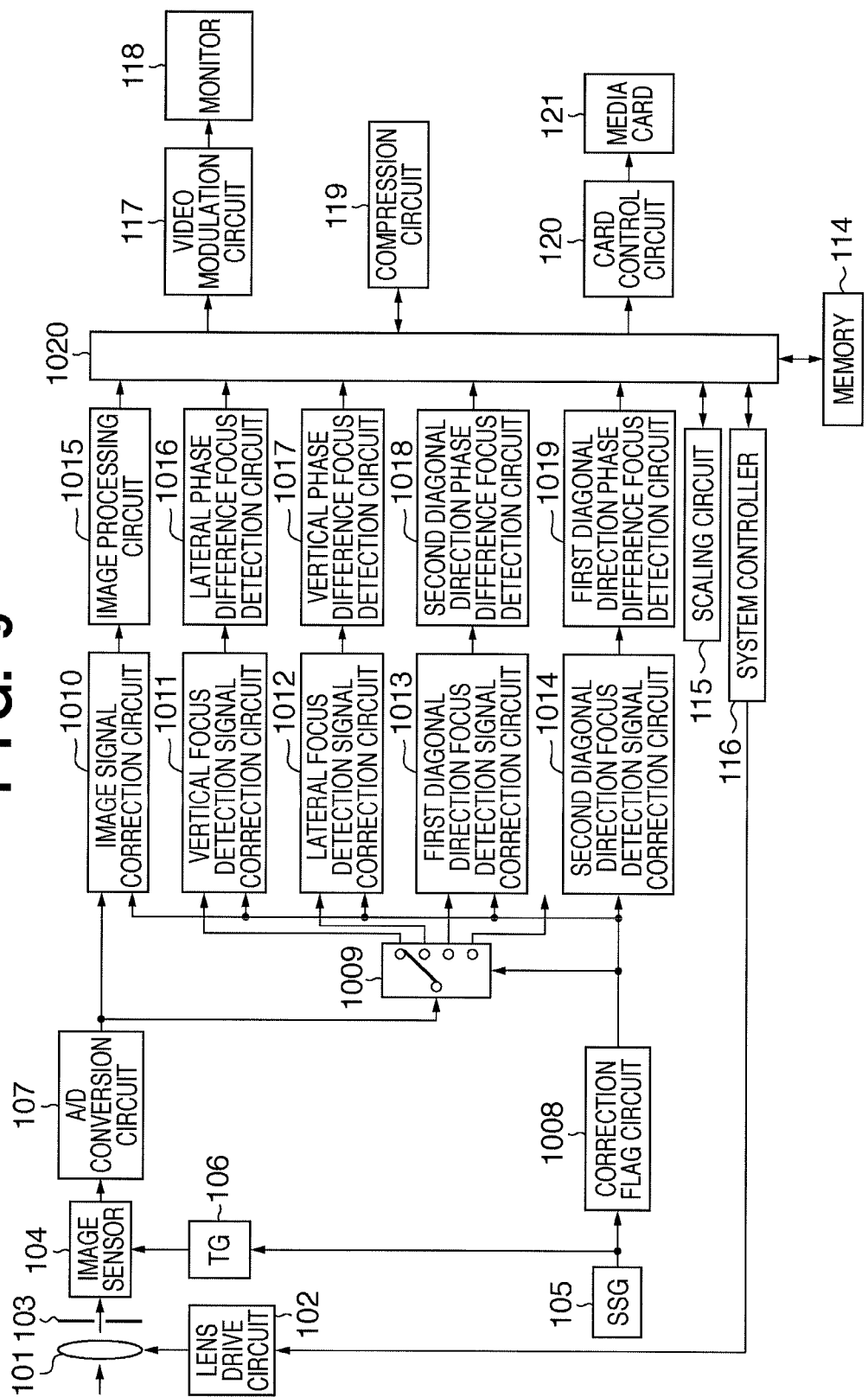
FIG. 9 is a block diagram of an image capturing apparatus according to a preferred second embodiment of the present invention.

FIG. 9 is a circuit configuration diagram of an image capturing apparatus according to a preferred second embodiment of the present invention. A description of an image capture operation performed by the circuit shown in FIG. 9 follows. It is to be noted that the same reference numerals are provided for those elements of the configuration that are the same as those shown in FIG. 1 and a description thereof is omitted. In addition, FIG. 16 is a flow chart showing the procedure for a correction process of the second embodiment, and the description proceeds while referring thereto as convenient. Processes that are the same as those shown in FIG. 15 are given the same step numbers.

As with the first embodiment, light entering from the image sensing lenses 101 is photoelectrically converted into electrical signals at the image sensor 104 and then converted into digital image data at the A/D conversion circuit 107.

Figure 10:
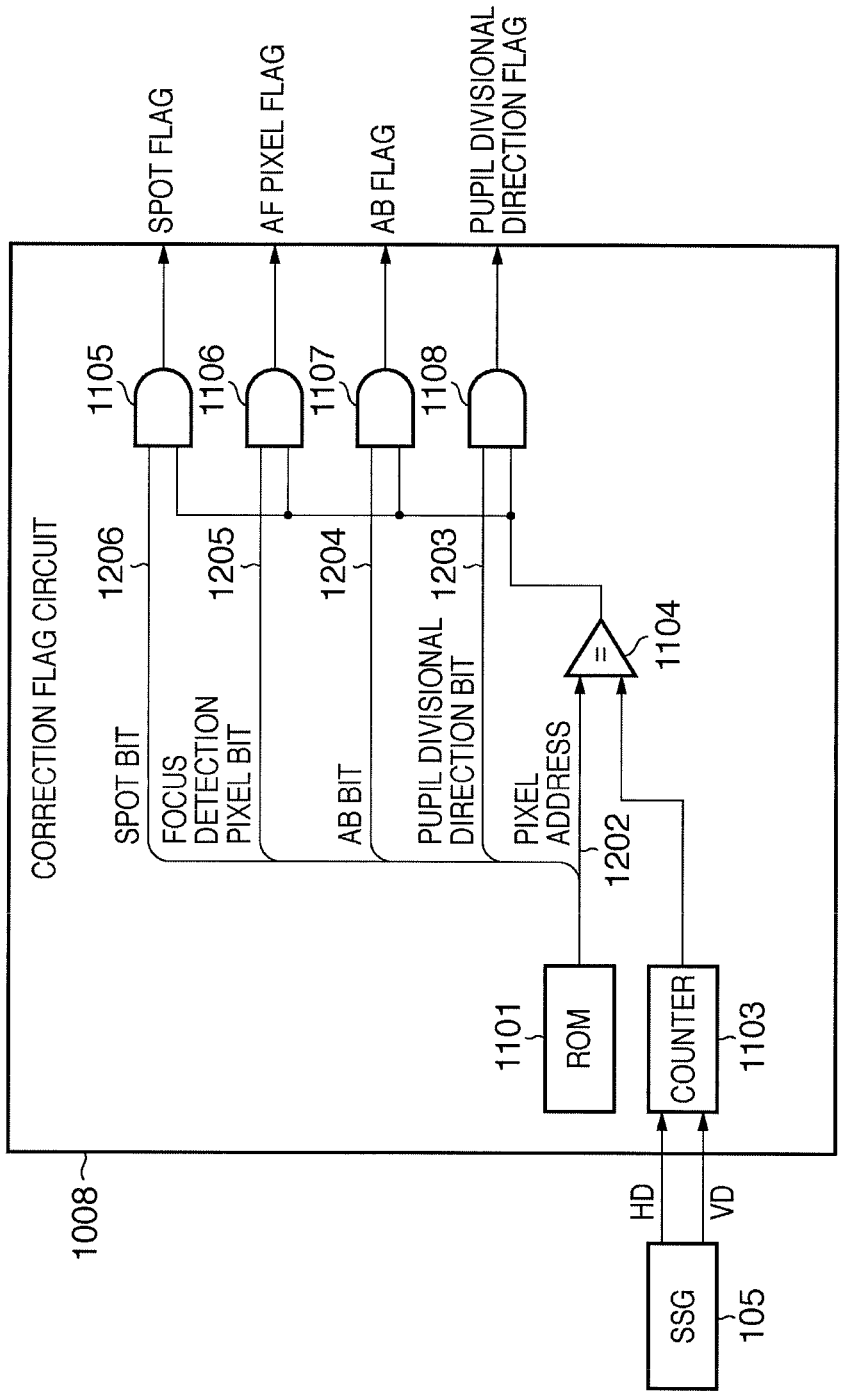
FIG. 10 is a circuit diagram of a correction flag circuit.

A correction flag circuit 1008 operates a spot flag, a focus detection pixel flag, an AB flag (pixel information), and a pupil divisional direction flag (pupil divisional information) in accordance with correction information stored in advance on a ROM 1101 in FIG. 10.

Here, a description is given of the operation of the correction flag circuit 1008, using FIG. 10.

The ROM 1101 stores the correction information 1201. A counter 1103 is a counter depending on the synchronization signals HD and VD outputted from the SSG 105. A comparator 1104 compares the value of a pixel address 1202 included in the correction information 1201 with a counter value outputted from the counter 1103, and if the values are equal, then it outputs a High level signal, and if the values are not equal, then it outputs a Low level signal. An AND circuit 1105 outputs a spot bit 1206 included in the correction information 1201 in a case where High level signal is outputted by the comparator 204, and outputs a Low level signal whenever the Low level signal is output from the comparator 204. An AND circuit 1106 outputs a focus detection pixel bit 1205 included in the correction information 1201 when the High level signal is output from the comparator 204, while outputs a Low level signal whenever the Low level signal is outputted from the comparator 204. An AND circuit 1107 outputs an AB bit 1204 included in the correction information 1201 when the High level signal is output form the comparator 1104, while outputs a Low level signal whenever the Low level signal is outputted from the comparator 204. An AND circuit 1108 outputs a pupil divisional direction bit 1203 included in the correction information 1201 when the High level signal is output form the comparator 1104, while outputs a Low level signal whenever the Low level signal is outputted from the comparator 204.

Figure 11:
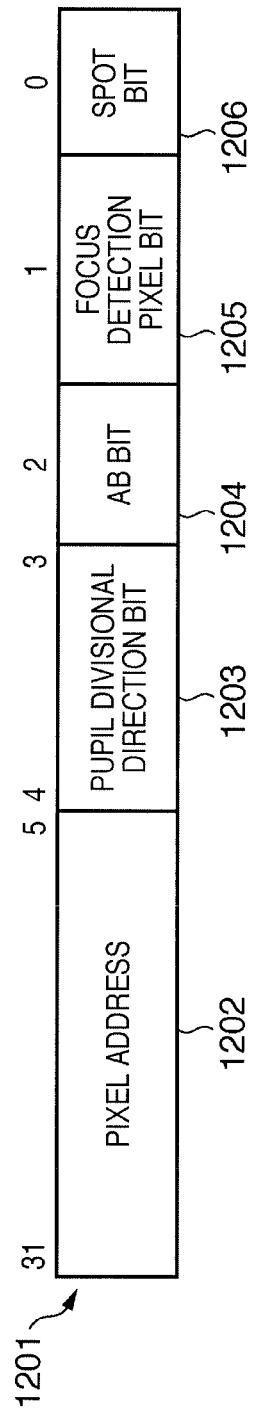
FIG. 11 is a diagram showing a structure of correction information stored in a ROM.

The counter 1103 counts the number of pixels in accordance with the horizontal synchronization signal HD and the vertical synchronization signal VD output from an SSG 105. In the ROM 1101, the correction information 1201 as shown in FIG. 11 is recorded. It is to be noted that each correction information 1201 holds one pixel of information. Here, although an example is given of a case in which 32 bits of correction information 1201 are recorded, the present invention is not limited thereto. In the correction information 1201 are included the pixel address 1202, which is information indicating the position of the pixel to be corrected, the pupil divisional direction bit 1203, the AB bit 1204, the focus detection pixel bit 1205, and the spot bit 1206. Here, the pixel address 1202 is 27 bits, the pupil divisional direction bit 1203 is 2 bits, the AB bit 1204 is 1 bit, the focus detection pixel bit 1205 is 1 bit, and the spot bit 1206 is 1 bit. However, the present invention is not limited thereto.

When the focus detection pixels bit 1205 is "0", it indicates an image forming pixel, and when the focus detection pixel bit 1205 is "1", it indicates a focus detection pixel. When the spot bit 1206 is "0" it indicates no spot, and when it is "1" it indicates that there is a spot. As with the first embodiment, in the second embodiment as well if one of a pair of focus detection pixels has a spot the spot bit of the other pixel of the pair of focus detection pixels is set at "1" and stored in the ROM 1101.

The pupil divisional direction bit 1203 shows the direction in which the pupil is divided, as shown in FIG. 12. Areas 1311-1318 are light-receiving portions.

When the pupil divisional direction bit 1203 is "00", it indicates that the pupil is divided laterally, as represented by a focus detection pixel 1301 for image A and a focus detection pixel 1302 for image B.

When the pupil divisional direction bit 1203 is "01", it indicates that the pupil is divided vertically as represented by a focus detection pixel 1303 for image A and a focus detection pixel 1304 for image B.

When the pupil divisional direction bit 1203 is "10", it indicates that the pupil is divided in a first diagonal direction as represented by a focus detection pixel 1305 for image A and a focus detection pixel 1306 for image B.

When the pupil divisional direction bit 1203 is "11", it indicates that the pupil is divided in a second diagonal direction as represented by a focus detection pixel 1307 for image A and a focus detection pixel 1308 for image B.

In addition, as shown in FIG. 12, one of the 2 focus detection pixels is used for image A and the other is used for image B, such that, when correcting a focus detection pixel for image A, correction is performed using a focus detection pixel for image A, and when correction a focus detection pixel for image B, correction is performed using a focus detection pixel for image B.

When the AB bit 1204 is "0" it indicates that the focus detection pixel is for image A, and when the AB bit 1204 is "1" it indicates that the focus detection pixel is for image B.

When a value on the counter 1103 matches the pixel address 1202 read out from the ROM 1101 (step S11), the spot flag, focus detection pixel flag, AB flag, and pupil divisional direction flag, respectively, are output in accordance with the spot bit 1206, the focus detection pixel bit 1205, the AB bit 1204 and the pupil divisional direction bit 1203 information.

In FIG. 9, the image data output from the A/D conversion circuit 107 is input to a selector 1009 and an image signal correction circuit 1010. The pupil divisional direction flag output from the correction flag circuit 1008 is input to the selector 1009. In addition, the spot flag, focus detection pixel flag, AB flag, and pupil divisional direction flag output from the correction flag circuit 1008 are input to later-stage circuits 1010-1014 of the selector 1009.

When a spot flag or a focus detection pixel flag is output (NO at step S12), the image signal correction circuit 1010 executes correction processing of the relevant pixel (step S13). The operations of the image signal correction circuit 1010 and the image processing circuit 1015 are the same as those of the image signal correction circuit 109 and the image processing circuit 111 of the first embodiment, and therefore description thereof is omitted.

The selector 1009 shown in FIG. 9 determines the destination of the image data output from the A/D conversion circuit 107 in accordance with the 2-bit pupil divisional direction flag output from the correction flag circuit 1008 (step S23).

When the pupil divisional direction flag is "00" ("lateral" in step S23), the image data output from the A/D conversion circuit 1007 is input to the vertical focus detection signal correction circuit 1011.

When the pupil divisional direction flag is "01" ("vertical" in step S23), the image data output from the A/D conversion circuit 1007 is input to the lateral focus detection signal correction circuit 1012.

When the pupil divisional direction flag is "10" ("first diagonal direction" in step S23), the image data output from the A/D conversion circuit 1007 is input to the second diagonal direction focus detection signal correction circuit 1014.

When the pupil divisional direction flag is "11" ("second diagonal direction" in step S23), the image data output from the A/D conversion circuit 1007 is input to the first diagonal direction focus detection signal correction circuit 1013.

Then, at the above-described circuits 1011-1014, the focus detection pixel is extracted from the inputted image data and image data of the defect focus detection pixel is corrected.

Figure 13:
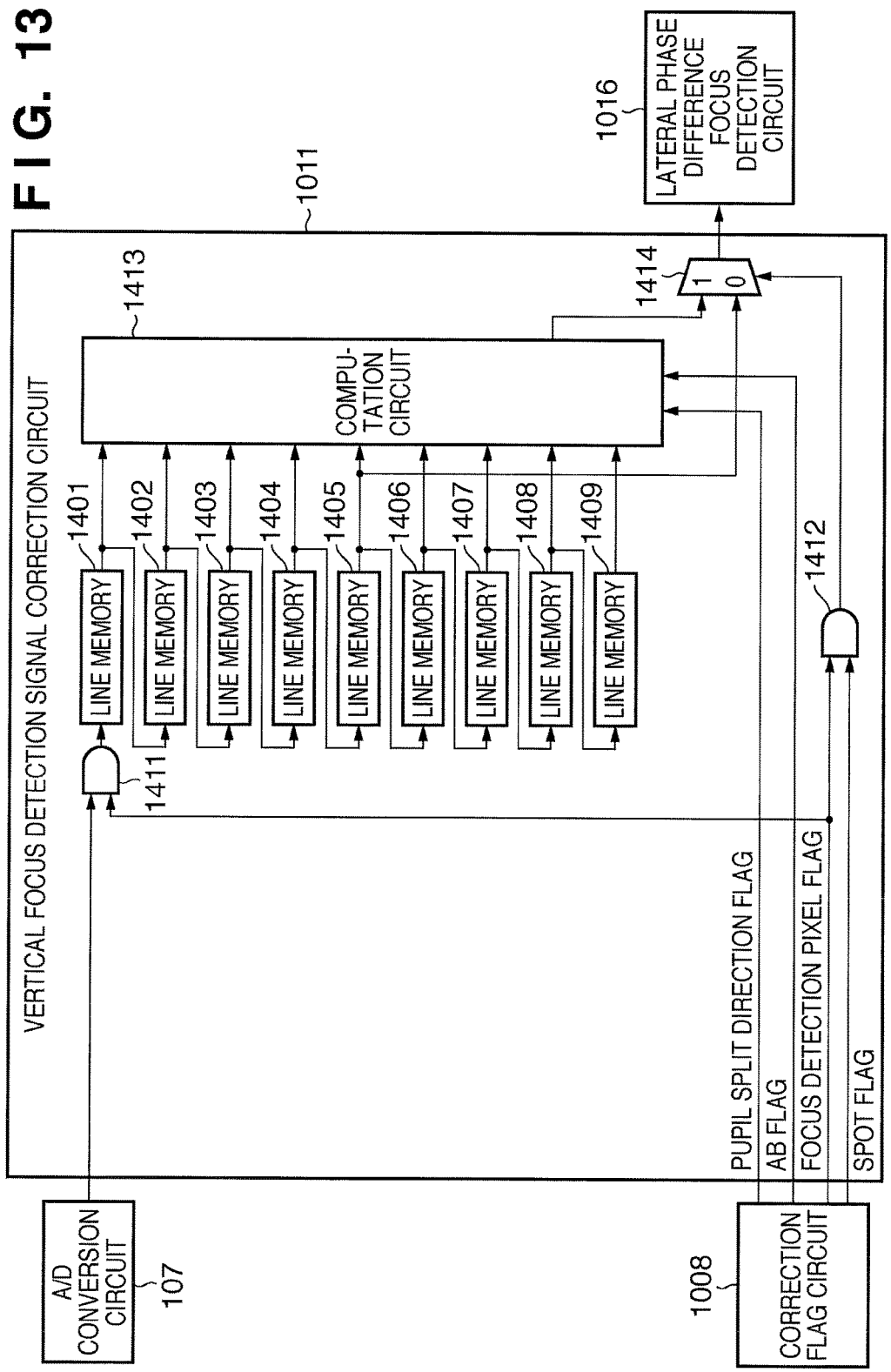
FIG. 13 is a circuit diagram of a vertical focus detection signal correction circuit.

FIG. 13 shows the circuit configuration of the vertical focus detection signal correction circuit 1011. It is to be noted that the selector 1009 is omitted. Therefore, what is shown is the circuit configuration in a case in which image data is sent to the vertical focus detection signal correction circuit 1011 from the A/D conversion circuit 107 by the selector 1009.

The image data output from the A/D conversion circuit 107 is input to an AND circuit 1411, as is pixel data for which the focus detection pixel flag is "1", such that the image data is then sequentially stored in line memories 1401-1409. Correction target pixels are pixels whose image data have come to a center position in the line memories 1401-1409, that is, image data positioned at the center of line memory 1405. The pupil divisional direction flag, the AB flag, the spot flag, and the focus detection pixel flag are each delayed so as to show the correction target pixel information. At a computation circuit 1413, the correction target pixel image data is corrected using image data output from focus detection pixels located around the correction target pixel, in accordance with the pupil divisional direction flag and the AB flag.

When both the spot flag and focus detection pixel flag output from the correction flag circuit 1008 are raised, and that is, for a focus detection pixel that has a defect, a selector 1414 outputs the pixel data corrected at the computation circuit 1413, and at all other times, that is, for focus detection pixels with no defects, image data of correction target pixels positioned at the center of the line memory 1405 is output as is, without computation. The output of the selector 1414 is input to a lateral phase difference focus detection circuit 1016.

In addition, the circuit configuration diagram of FIG. 13 is the same for the lateral focus detection signal correction circuit 1012, the first diagonal direction focus detection signal correction circuit 1013, and the second diagonal direction focus detection signal correction circuits 1014.

Figure 14:
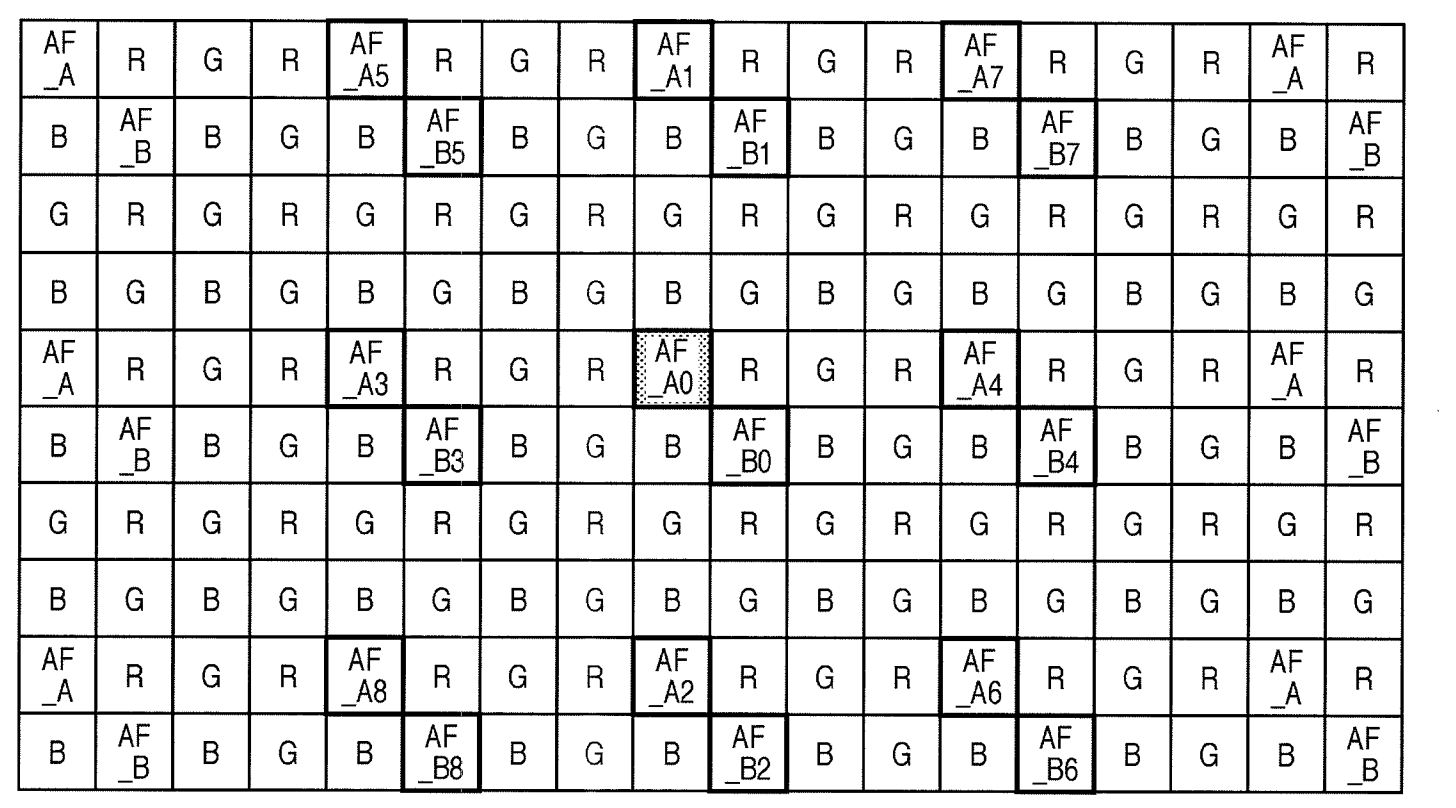

FIG. 14 is a diagram illustrating correction of image data of a focus detection pixel AF_A0 that has a defect, among focus detection pixel data stored in the line memories 1401-1409 in each of the circuits 1011-1014. Consider a case in which there are no defects on focus detection pixels AF_A1-AF_A8 in the vicinity of the focus detection pixel AF_A0 for image A.

In the vertical focus detection signal correction circuit 1011, in order to correct the image data of focus detection pixels that are divided laterally like the focus detection pixel 1301 and the focus detection pixel 1302 shown in FIG. 12, image data of upper and lower focus detection pixels positioned perpendicular to the pupil divisional direction is used (step S24). Therefore, computations are performed such that AF_A0=(AF_A1+AF_A2)/2. Moreover, since the spot flag is set at "1" for focus detection pixel AF_B0 that is paired with the focus detection pixel AF_A0 as well, computations are performed such that AF_B0=(AF_B1+AF_B2)/2.

In the lateral focus detection signal correction circuit 1012, in order to correct the image data of focus detection pixels that are divided vertically like the focus detection pixel 1303 and the focus detection pixel 1304 shown in FIG. 12, image data of lateral focus detection pixels positioned perpendicular to the pupil divisional direction is used (step S25). Therefore, computations are performed such that AF_A0=(AF_A3+AF_A4)/2. Moreover, computations are performed such that AF_B0=(AF_B3+AF_B4)/2.

In the first diagonal direction focus detection signal correction circuit 1013, the image data of focus detection pixels that are divided in the second diagonal direction like the focus detection pixel 1307 and the focus detection pixel 1308 shown in FIG. 12 is corrected. In order to do so, image data of focus detection pixels positioned in the first diagonal direction perpendicular to the second diagonal direction is used (step S26). Therefore, computations are performed such that AF_A0=(AF_A5+AF_A6)/2. Moreover, computations are performed such that AF_B0=(AF_B5+AF_B6)/2.

In the second diagonal direction focus detection signal correction circuit 1014, the image data of focus detection pixels that are divided in the second diagonal direction like the focus detection pixel 1305 and the focus detection pixel 1306 shown in FIG. 12 is corrected. In order to do so, image data focus detection pixels positioned in the second diagonal direction perpendicular to the first diagonal direction is used (step S27). Therefore, computations are performed such that AF_A0=(AF_A7+AF_A8)/2. Moreover, computations are performed such that AF_B0=(AF_B7+AF_B8)/2.

However, in a defocus state or a state of competing perspectives, when for example a bright subject (e.g., a bright spot) or the like shows up in a line near the line that performs focus detection pixel correction, there can be cases in which it is not advantageous to perform correction using pixels positioned in directions perpendicular to the pupil divisional direction.

Next, focus detection is performed employing corrected focus detection pixel data at the focus detection signal correction circuits 1016-1019.

The phase difference information detected at the horizontal phase difference focus detection circuit 1016, the vertical phase difference focus detection circuit 1017, the second diagonal direction phase difference focus detection circuit 1018 and the first diagonal direction phase difference focus detection circuit 1019 is sent to the system controller 116. The system controller 116 then controls the lens drive circuit 102 based on the sent phase difference information to adjust the image sensing lens 101.

At the image processing circuit 1015, the signal-processed image data is scaled to a size suitable for display on the monitor 118 by the scaling circuit 115 and displayed on the monitor 118. Alternatively, the image data signal-processed at the image processing circuit 1015 is scaled to a size suitable for recording on a media card 114 and, after being compressed by the compression circuit 119, written onto the media card 114.

Thus, as described above, because phases of the focus detection pixels are distinguished, correction can be performed without loss of phase accuracy. Moreover, since pupil divided direction is distinguished for each focus detection pixel, correction can be performed without loss of pupil division properties.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2007-318997, filed on Dec. 10, 2007, which is hereby incorporated by reference herein in its entirety.

The invention claimed is:

1. An image capturing apparatus comprising:
    an image sensor having at least part of pixels arranged in two dimensions are comprised of a plurality of pairs of first detection pixels and second detection pixels, the first detection pixels and the second detection pixels respectively receiving light fluxes that have passed through different pupil regions of a photographing optical system;
    a memory control circuit configured to read out, from a memory, position information for the detection pixels and pixel information for identifying the first detection pixels and the second detection pixels stored in the memory; and
    a correction circuit configured to identify positions of the detection pixels in the image sensor based on the position information for the detection pixels and to correct, based on the pixel information, a defective first detection pixel signal using defect-free first detection pixel signals and a defective second detection pixel signal using defect-free second detection pixel signals.

2. The image capturing apparatus according to claim 1, wherein the correction circuit, in a case in which there is a defect in one of a pair of the first detection pixel and the second detection pixel, in addition to correcting the defective detection pixel signal of one of the first and second detection pixels, also corrects the defect-free pixel signal of the other.

3. The image capturing apparatus according to claim 1, wherein the memory control circuit is further configured to store, in the memory, pupil-divisional information indicating a direction of pupil division, and the correction circuit, based on the pupil-divisional information, is configured to perform correction using image signals of defect-free detection pixels located in a direction perpendicular to the direction of the pupil division.

4. The image capturing apparatus according to claim 1, further comprising a focus detection circuit configured to obtain a defocus amount indicating a defocus state of the photographing optical system.

5. The image capturing apparatus according to claim 1, wherein the correction circuit corrects the defective first or second detection pixel signal using image signals of pixels around the defective first or second detection pixels.

6. The image capturing apparatus according to claim 1, wherein the image sensor includes image forming pixels that receive incident light passed through the photographing optical system, and the correction circuit performs;
- a first generation of identifying positions of the detection pixels in the image sensor based on the position information for the detection pixels and generating a pixel signal, for focus detection, corresponding to a defective detection pixel using pixel signals of defect-free detection pixels, and
- a second generation of identifying positions of the detection pixels in the image sensor based on the position information for the detection pixels and generating a pixel signal, for image recording, corresponding to the defective detection pixel using pixel signals of the image forming pixels.

7. A control method of controlling an image capturing apparatus provided with an image sensor in which at least part of pixels arranged in two dimensions are comprised of a plurality of pairs of first detection pixels and second detection pixels, the first detection pixels and the second detection pixels respectively receiving light fluxes that have passed through different pupil regions of a photographing optical system, the control method comprising:
- a read-out step of reading out, from a memory, position information for the first and second detection pixels and pixel information for distinguishing between the first detection pixels and the second detection pixels stored in a memory; and
- a correction step of identifying positions of the detection pixels in the image sensor based on the position information for the detection pixels and correcting, based on the pixel information, a defective first detection pixel signal using defect-free first detection pixel signals and a defective second detection pixel signal using defect-free second detection pixel signals.

* * * * *